United States Patent [19]

Tanaka et al.

[11] Patent Number: 4,548,291

[45] Date of Patent: Oct. 22, 1985

[54] STEERING SYSTEM OF A VEHICLE

[75] Inventors: Tomiho Tanaka, Sakai; Masahide Osujo, Sennan, both of Japan

[73] Assignee: Kubota, Ltd., Japan

[21] Appl. No.: 541,374

[22] Filed: Oct. 13, 1983

[30] Foreign Application Priority Data

Oct. 20, 1982 [JP] Japan ............................. 57-15992[U]

[51] Int. Cl.[4] ............................................. B62D 1/18
[52] U.S. Cl. ...................................... 180/321; 74/492; 180/78
[58] Field of Search ............... 180/315, 320, 321, 323, 180/326, 330, 78, 79; 74/492, 496, 498, 499, 500

[56] References Cited

U.S. PATENT DOCUMENTS 4,450,927  5/1984  Hirata et al. .................... 180/330

Primary Examiner—Joseph F. Peters, Jr.
Assistant Examiner—Donn McGiehan
Attorney, Agent, or Firm—Kane, Dalsimer, Kane, Sullivan and Kurucz

[57] ABSTRACT

A system for maneuvering steerable running wheels of a vehicle by means of a steering wheel via gear case equipped with input and output shafts and a gearing mechanism operatively interconnecting these shafts. On the vehicle, the output shaft is disposed outer than the input shaft, and the gearing mechanism is constructed with helical gears fitted respectively on the input and output shafts.

3 Claims, 9 Drawing Figures

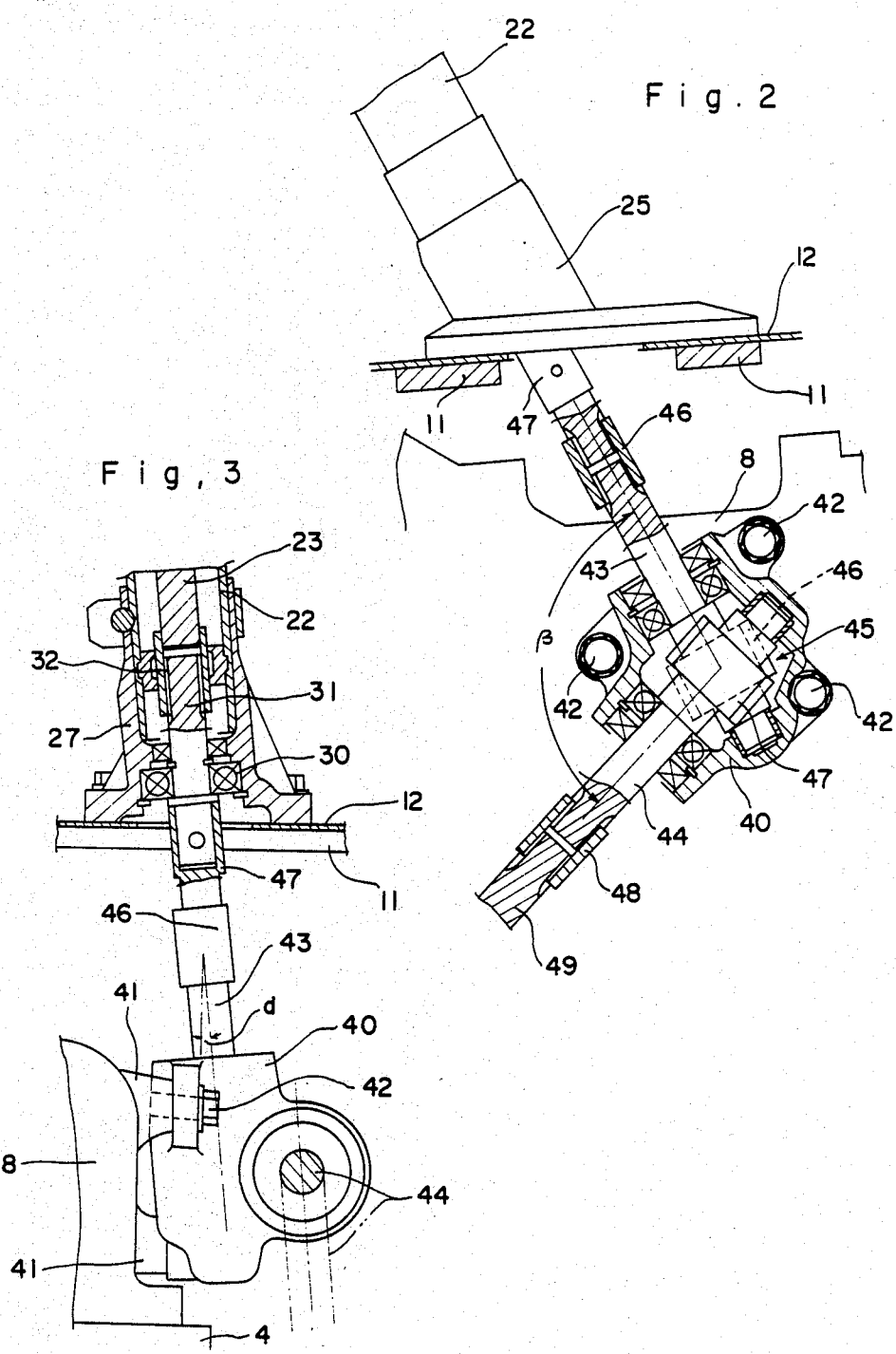

4,548,291

STEERING SYSTEM OF A VEHICLE

BACKGROUND OF THE INVENTION

This invention relates to a steering system of a vehicle as a forward-and-rearward reversing-type tractor or the like.

Among vehicles for working, for instance tractors, there is a well-known type capable of a altering the operational posture between the forwardly facing operation and the rearwardly facing operation in accord with the working object, and having, for this purpose, necessary members including an operator's seat and a steering wheel with ancillary equipment such as steering-wheel post and the like, as are attachable arbitrarily reverseingly forward and rearward. In the case of this type of tractors, it is generally the practice to prepare a mounting base as securely attached to a lateral flank of an oilhydraulic apparatus which is in turn securely mounted on a rear portion of the vehicle and to attach, when in the rearwardly facing operation, the steering wheel post to the mounting base. The mounting base is equipped with a connection shaft for transmitting therethrough the steering effort as caused by means of maneuvering the steering wheel. When the steering wheels are front running wheels, it then is the conventional practice to have them thus maneuvered through the connection shaft further via multiplicity of intermediary universal joints and rotary shafts, and there has been a drawback in such steering in that twisting phenomenon is apt to occur at such universal joints and thus that light and swift maneuvering gets hampered. Besides, since such steering-transmitting route consists of contiguous broken lines with junctions made up of simple universal joints, there also is a drawback, in the case the transverse width of the vehicle body is larger than the transverse width of the oilhydraulic apparatus, in that the broken-band angles of the universal joints accordingly get larger.

SUMMARY OF THE INVENTION

This invention has as its object to remedy the above-mentioned conventional drawbacks and to provide a steering system capable of light and swift maneuvering, utilizing a gearing mechanism consisting of helical gears. More particularly, this invention essentially resides: in a steering system of a wheeled vehicle having a vehicle body and running wheels at least partly steerable by means of the steering system, of the type comprising: a steering wheel; a steering-wheel shaft; a gear case which is securely attached to a lateral flank of a suitable member mounted on the vehicle body and which has: an input shaft piercing therethrough, an output shaft also pircing therethrough, and a gearing mechanism accommodated therein; such that the steering wheel, the steering wheel shaft, the input shaft, the gearing mechanism and the output shaft are serially operatively connected in this order ultimately to maneuver the steering wheels; in the improvement to the effect that the input and output shafts are disposed as spaced apart from each other in a transverse direction of the vehicle body, thus in an inner-and-outer relationship such that the input shaft is on the inner side and the output shaft is on the outer side of the vehicle body; and that the gearing mechanism operatively interconnecting such input and output shafts is constructed with helical gears securely fitted on these respective shafts.

In constrast with the conventional structure using universal joints in the broken bending portions in the steering-transmitting route, this structure according to the present invention enables light and swift maneuvering as intended, without any serious twisting or the like. Besides, the degree of the maneuvering force may arbitrarily be set or selected by properly designing the gearing ratio of the helical gears, Still further, the transversely spaced disposition of the input and output shafts, with the input shaft on the inner side and the output shaft on the outer side of the vehicle body, enables to have the output shaft saliently protrude outwardly of the vehicle body, thus effectively preventing interference with the vehicle body. Here, again, the degree or amount of the protrusion may likewise be selected by properly designing the gearing ratio of the helical gears.

These and still other advantages of this invention will be apparent from the detailed description of the illustrated embodiments to follow hereunder.

BRIEF DESCRIPTION OF THE DRAWINGS

The drawings show, by way of example, a couple of embodiments of this invention as incorporated in a forward-and-rearward reversing-type tractor, in which

FIG. 2 is an enlarged sectional side elevation of further restricted essential portions showing how a steering-wheel post is mounted when in the rearwardly facing operation;

FIG. 3 is a front end view, partly in section, of the parts essentially the same as in FIG. 2;

DESCRIPTION OF THE PREFERED EMBODIMENTS

Figure 1:
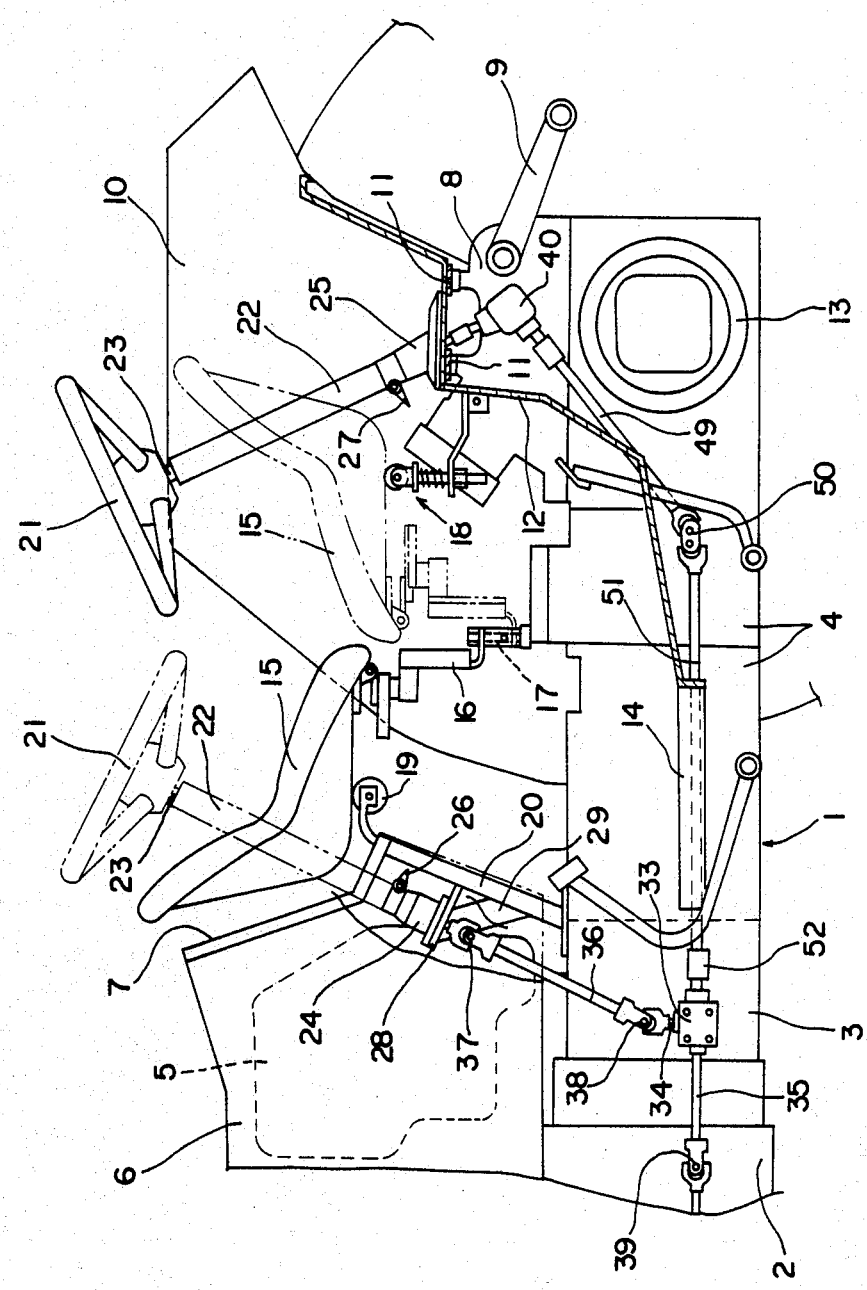
FIG. 1 is a fragmentary side elevation, partly in section, of the parts essential to this invention.
Figure 4:
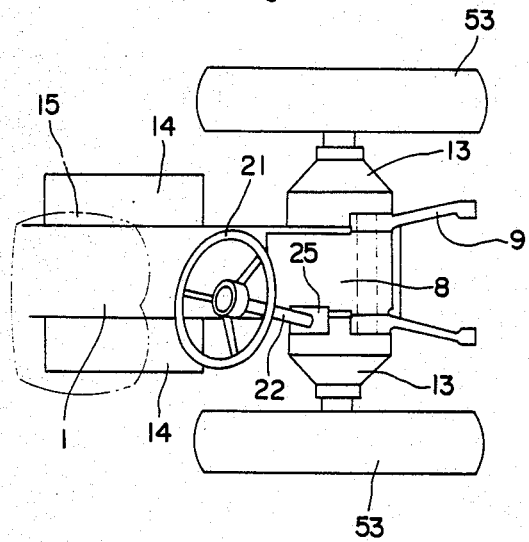
FIG. 4 is s schematic overall plan view of the tractor.

Refeering particularly to FIG. 1, shown generally at 1 is a vehicle body of a forward-and-rearward reversing-type tractor as seen in its overall schematic plan view in FIG. 4, and it consists essentially of an engine 2, a clutch housing 3 and a transmission case 4. Further seen at 5 is a fuel tank, while at 6 is a bonnet having an instrument panel 7 at its rear end portion. At 8 is an oilhydraulic apparatus mounted on a rear portion of the vehicle body 1, and it has lift arms 9 of which only one is seen in FIG. 1. At 10 are a pair of left and right wheel fenders, similarly shown here only the righthand one. In between these fenders 10 there is attached a floor cover 12 via support members 11 and the like. At 13 is a rear axle case, and at 14 are steps. Shown at 15 is an operator's seat, pivotally supported by a support shaft 17 on the vehicle body 1 via a support mechanism 16 at a front end portion, and it is thus reversingly movable forward and rearward about this support shaft 17 between a forwardly facing posture shown in phantom and a rearwardly facing posture shown in solid lines. At 18 is a shock-damping support means to support a rear portion of the operator's seat 15 in the forwardly facing posture. As a counterpart, shown at 19 is a support roller to support a rear portion of the operator's seat 15 in the rearwardly facing posture, and it is mounted on a support frame 20, which in turn is mounted on the vehicle body 1 at a location in proper correspondence to a rear end portion of the bonnet 6, such that it is possible to have same protrude outward and retract inward with respect to the bonnet 6. At 21 is a steering wheel, fitted on an upper end of a steering-wheel shaft 23 which is inserted in a steering-wheel post 22. This steering-wheel post 22 is arbitrarily alternatively attached to and detached from a mounting base 24 for the forwardly facing operation and another mounting base 25 for the rearwardly facing operation, and is lockable to the mounting base 24 or 25 by means of the respective locking lever 26 or 27. The mounting base 24 for the forwardly facing operation is positioned at a left-and-right central portion of the vehicle body 1, as attached to the already-mentioned support frame 20 via the intermediary including a support base 28 and a bracket 29 so as to be on a level higher than the vehicle body 1, namely spaced apart from its top surface. On the other hand, the mounting base 25 is mounted on the support members 11 and so forth, and as shown in FIGS. 2 and 3 this mounting base 25 is equipped with a connection shaft 31 which is fitted in and rotatably supported by a ball bearing 30. The steering-wheel shaft 23 has its lower end formed as a connection part 32, and when the steering-wheel post 22 together with the steering-wheel shaft 23 accommodated therein is attached to the mounting base 27 then the connection part 32 is fittedly engaged with the connection shaft 31, in a fashion capable of releasing the engagement when needed. Shown at 33 is a fore gear case, clampedly connected by means of bolts to one lateral flank of the clutch housing 3 serving as a part of the vehicle body 1. As is further referred to and described in detail with reference to FIGS. 6–9 somewhat later, this fore gear case 33 is pierced through its walls by an input shaft 34 and a rotary shaft 35, equipped with a bevel-gear mechanism 56 for operative interlocking therebetween. The input shaft 34 is disposed to extend in upward protrusion along the clutch housing 3, and is operatively connected to a connection shaft of the mounting base 24 via an interlocking shaft 36, which is disposed outside the clutch housing 3 in slanting in the left-and-right direction, and universal joints 37,38 on both ends thereof. The rotary shaft 35 pierces through the fore gear case 33 so as to thereby be journalled to extend substantially in parallel with the longitudinal axis of the vehicle body 1, and its front end is operatively connected, via the intermediary including a universal joint 39, to front wheels which are supposed here to be steerable wheels. As a counterpart of the fore gear case 33, shown at 40 is a rear case, clampedly connected as shown in FIGS. 2 and 3 by means of bolts 42 to a mounting seat 41 which is formed on one lateral flank of the oilhydraulic apparatus 8. This rear gear case 40 is pierced through its walls by its input shaft 43 and output shaft 44, equipped with a gearing mechanism 45 for operative interlocking therebetween. These input and output shafts 43, 44 are disposed as spaced apart from each other in the transverse direction of the vehicle body 1, thus in an inner-and-outer relationship such that the input shaft 43 is on the inner side and the output shaft 44 is on the outer side of the vehicle body 1. More particularly, the input shaft 43 is disposed to extend slant, as viewed transversely to the vehicle body 1 thus as in FIG. 2, by a set angle back and forth in such sense so as to locate its upper end forwards, and also slant, further as viewed longitudinally of the vehicle body 1 thus as in FIG. 3, by an angle d with respect to the longitudinal vertical plane passing the seating surface of the mounting seat 41, in such sense so as to locate its lower end to the outer side of the vehicle body 1. As is clear from FIGS. 2 and 3, the steering-wheel shaft 23 is set, via joints 46,47 and the already-mentioned connection shaft 31, to extend on the extension of the axis of this input shaft 43. Consequently, the steering-wheel post 22 extends upward as shown in FIG. 4 forwardly inwardly, thus resulting in that the steering wheel 21 comes accordingly closer to the left-and-right central portion of the vehicle body 1. On the other hand, the output shaft 44 is disposed to extend slant, as in FIG. 2, forwardly downwardly from the rear gear case 40, and also slant, as in FIG. 3, by the same angle d and in the same sense just similar to the aforementioned input shaft 43 so long as this slanting with respect to the said vertical plane is concerned. As is best seen in FIG. 2, the gearing mechanism 45 is constructed with helical gears 46,47 securely fitted on these input and output shafts 43,44, respectively. As a matter of course, the gears 46,47 are in operative drive meshing with each other. As is clear from FIGS. 1 and 2, the output shaft 44 is operatively connected to the rotary shaft 35 via a joint 48, an interlocking shaft 49, a universal joint 50, another interlocking shaft 51 and another joint 52. By the way, as to the interlocking shafts 49,51, preferably depending upon need, to have the vehicle body 1 support the same by means of suitable bearing means. Shown at 53 in FIG. 4 are rear running wheels.

Figure 5:
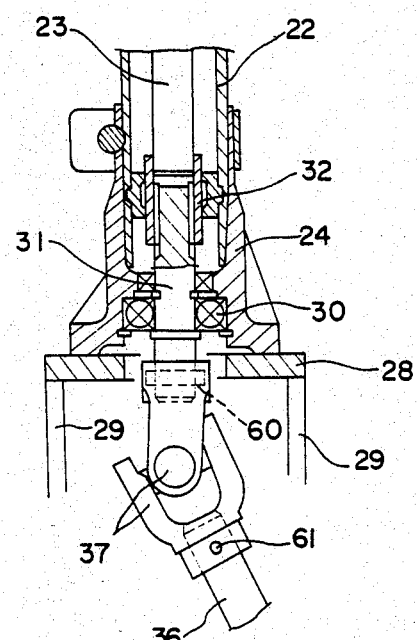
FIG. 5 is a sectional side elevation corresponding to FIG. 2 but showing here how the steering-wheel post is mounted when in the forwardly facing operation.
Figure 6:
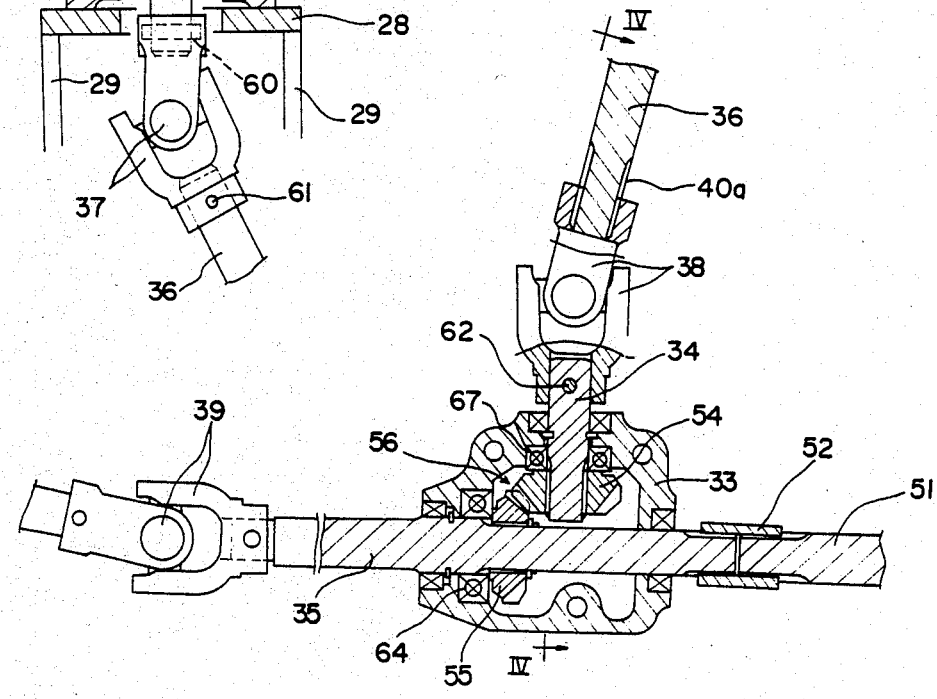
FIG. 6 is a side elevation, in longitudinal section, of a force gear case and parts therearound.
Figure 7:
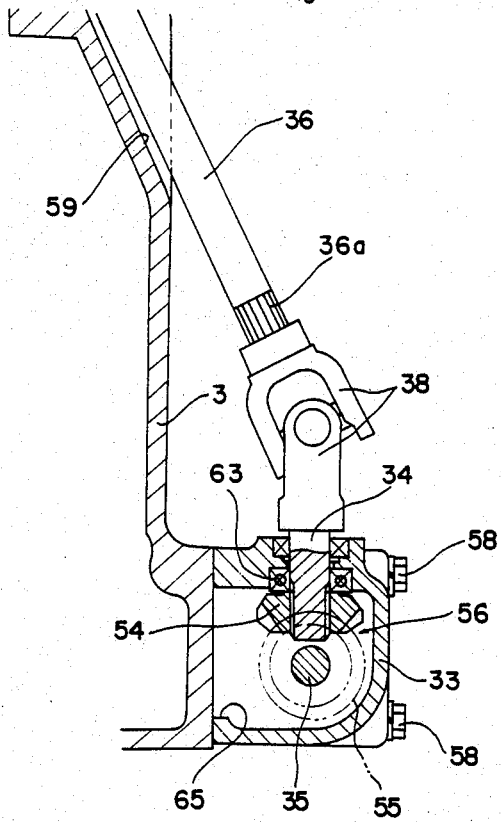
FIG. 7 is a side elevation, in transverse section, of the parts essentially the same as in FIG. 6.
Figure 8:
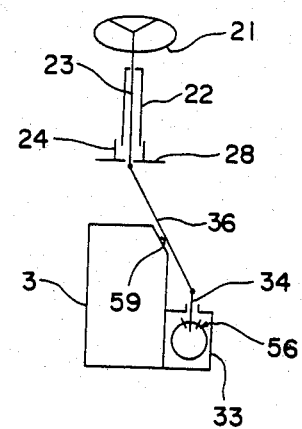
FIG. 8 is a schematic illustration showing steering-transmitting route, as viewed in the direction the same as in FIG. 7.

Looking in further detail into the mounting base 24 with reference to FIG. 5, it is equipped with a connection shaft 31 which is rotatably supported by a ball bearing 30. When the steering-wheel post 22 together with the steering-wheel shaft 23 accommodated therein is attached to this mounting base 24, then the connection part 32 as has already been described with respect to the other mounting base 25 is fittedly engaged with the connection shaft 31, again in a fashion capable of releasing the engagement when needed. Referring now specifically to FIGS. 6–8 in order to lock specifically into the fore gear case 33 already mentioned on a previous occasion, the bevel-gear mechanism 56 previously mentioned is constructed with bevel gears 54,55 securely fitted on the input shaft 34 and the rotary shaft 35, respectively. An upper corner portion of the clutch housing 3, as shown in FIG. 7, is provided with a recess 59 for prevention of interference with the interlocking shaft 36. Reverting to FIG. 5, the universal joint 37 has its ends fixedly secured to the connection shaft 31 and the interlocking shaft 36, respectively, by means of pins 60,61. On the other hand, the other universal joint 38 has, as seen in FIGS. 6 and 7, its upper end slidably splined on a matingly splined lower end portion 36a of the interlocking shaft 36, and has its lower end fixedly secured, by means of a pin 62, to the input shaft 34 of the fore gear case 33. Shown at 63,64 are ball bearings.

Operational feature and functional merits of the steering system of the construction as described hereinbefore will now be described. For the operation facing forward, operator's seat 15 and the steering wheel 21 together with its ancillary parts are mounted as shown in phantom in FIG. 1, while they are mounted as shown in solid lines for the operation facing rearward; as has already been mentioned.

When in the operation facing forward, the front running wheels are steered by means of maneuvering the steering wheel 21, via the steering-wheel shaft 23, interlocking shaft 36, input shaft 34, bevel-gear mechanism 56 and rotary shaft 35.

As a feature of the structure according to this invention, the interlocking shaft 36 is disposed outside the clutch housing 3, in contrast with the conventional practice of providing such shaft to slantly pierce through the clutch housing walls, thus making it unnecessary to provide such conventionally needed through bores in the clutch housing walls, contributing therefore to enhancing the strength of the clutch housing 3. Prerequisite to such outside disposition of the interlocking shaft 36 serving for operatively interconnecting the connection shaft 31 and the input shaft 34, is to provide the position of the mounting base 24 on a level higher than the vehicle body 1, thus spaced apart from its top surface. According to this invention, such proper disposition of the mounting base 24 is made quite easy, making good use of the support frame 20 which is primarily for supporting the operator's seat 15 in its rearwardly facing posture. This invention further makes it possible to restrain the necessary level of the mounting base 24 from becoming too high, in order to thereby enable compactization, by means of providing the recess 59 in the upper corner portion of the clutch housing 3 so that the interlocking shaft 36 may be disposed to pass through this recess 59 thus without any interference with the housing wall. As to the fore gear case 33, since it is attached to a lateral flank of the clutch housing 3, in a fashion as is perfectly partitioned from the interior of the clutch housing 3, it is quite easy to fill up the inner space of this gear case 33 with suitable lubricant to thus realize sufficient lubrication of the bevel-gear mechanism 56 and the ancillary parts. A further feature is that the interlocking shaft 36 and the universal joint 38 are engaged with each other in a splined manner as described hereinbefore, which enables the assembly work to be performed in such manner that the universal joint 38, as has been inwardly retracted splinedly on the interlocking shaft 36, is in good accessibility brought on to and fitten on the input shaft 34 and securedly pinned up thereto. In contrast with the conventional practice of assembling up these parts within the clutch housing, the assembly work of the structure according to this invention is far easier, thus contributing to enhancing the productivity.

Figure 9:
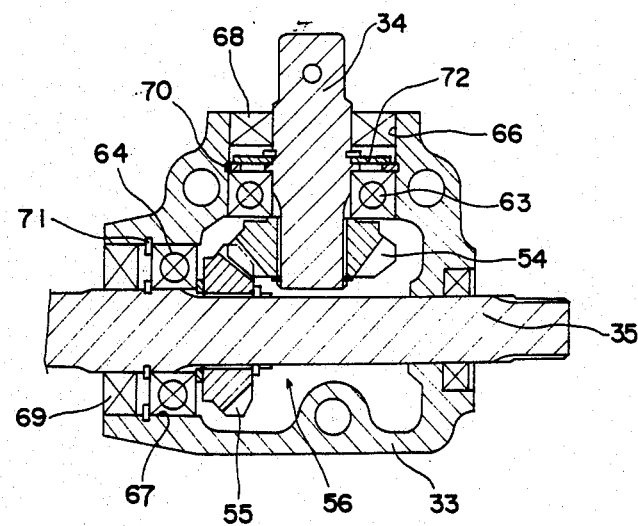
FIG. 9 is a further enlarged side elevation, in longitudinal section corresponding to FIG. 6 but showing here a modified force gear case.

The fore gear case 33 has its open mouth portion shown at 65 in FIG. 7, and the structure described hereinabove and illuatrated in FIGS. 6 and 7 requires for the assembly to first bring the bevel gears 54 and 55 into the inner space of the empty gear case 33 to be assembled, through the open mouth 65, and then within this gear case 33 to fit them on the input shaft 34 and the rotary shaft 35, respectively. A modified structure of the improvement such that the input shaft 34 and the rotary shaft 35 as have beforehand been fitted with the respective bevel gears 54,55 may thereafter be assembled up with the gear case 33, is shown in FIG. 9. Thus, the modified gear case 33 has open mouths or through bores 66,67 which are larger respectively than the bevel gears 54,55, to thus allow them to freely pass respectively therethrough. Respectively in these bores 66,67 there are fitted ball bearings 63,64 as well as oil-tight seals 68,69. Thus, it is hereby possible to first conveniently fit up the shafts 34,35 with the respective bevel gears 54,55, ball bearings 63,64, retainer rings 70,71, as well as shims as needed, and thereafter to assemble them up with the gear case 33. Machining of the bore walls is of no serious problem here, since the particularly needed work for to receive the respective mating retainer rings 70,71. By the way, seen at 72 is a reflection member.

The bevel-gear mechanism 56, as shown in FIGS. 6–7 and 9 and as described hereinabove, may instead be constrcuted with helical gears.

On the other hand, when in the operation facing rearward, then the front running wheels are steered by means of maneuvering the steering wheel 21, via the steering-wheel shaft 23, input shaft 43, gearing mechanism 45, output shaft 44, interlocking shafts 49,51 and rotary shaft 35. Thus, the steering of the front wheels is possible either from the front or the rear.

Since the maneuvering force exerted on the steering wheel 21 is here transmitted more specifically from the steering-wheel shaft 23 to the output shaft 44 through the connection shaft 31 and the input shaft 43 and via the helical gears 46,47, the problem of twisting and the like as has been prevailing with the conventional structure having complicate combination of universal joints is now eliminated, to thus enable light and swift maneuvering. Besides, proper setting or selection of the maneuvering force required here can be made by means of accordingly designing or selecting the gearing ratio of the helical gears 46,47. Use of the helical gears 46,47 according to this invention, as the gearing mechanism 45, results in that the input and output shafts 43,44 are staggeredly offsetting with each other as viewed in the longitudinal direction of the vehicle body 1, thus making it possible to dispose the input shaft 43 inwardly so as to bring the steering wheel 21 towards the transverse center namely near the longitudinal axis of the vehicle body 1, while disposing the output shaft 44 so as to protrude outwardly, more specifically disposing the output shaft 44 and the interlocking shaft 49 as spaced outwardly apart from the vehicle body 1 enough to prevent interference therewith, even if the transverse width of the vehicle body 1 is so large as to protrude considerably outwardly of the lateral flank of the oilhydraulic apparatus 8 on that side. Needless to say, the amount of this outward protrusion of the these shafts 44, 49 may as well as properly set or selected by means of accordingly designing or selecting the gearing ratio of the helical gears 46,47. There is a still further advantage according also from the use of the helical gears 46,47, in that the angle between the input and output shafts 43,44 as viewed transversely to the vehicle body 1, as shown at $\beta$ in FIG. 2, may as well quite freely be set by means of accordingly designing proper threading grooves of these gears meshing with each other, thus causing no problem even if a small angle $\beta$ is selected. A factor also contributing to enabling to bring the steering wheel 21 near the transverse center i.e. the longitudinal axis of the extension of which the steering-wheel shaft 23 coaxially extends, is disposed to extend slant by the angle d shown in FIG. 3. This coaxial disposition of the input shaft 43 and the steering-wheel shaft 23, one extending on the extension of the axis of the other, has made it needless to interpose any universal joint therebetween.

Although the gearing mechanism 45 using the helical gears 46,47 has by way of example been illustrated and hereinbefore described as is used for the rear gear case 40 intended for the operation facing rearward, the same construction may also be used as well for the operation facing forward. Besides, the structural member to mount the gear case 40 thereon is by no means limited to the oilhydraulic apparatus 8, but in fact any member rigidly mounted on the vehicle body 1 may as well be good for this purpose. Lastly, the steering system according to this invention may as a matter of course be incorporated as well in any vehicle other than tractors.

We claim:

1. A steering system for a vehicle having a vehicle body with a longitudinal axis, and running wheels steerable from a first and a second position, said second position being disposed rearwardly with respect to said first position, a working implement activating device with a lateral flank and mounted on a portion of a transmission case, disposed on the rear side of the vehicle body, and a clutch housing disposed on the front side of the vehicle body; said steering system comprising:
   (a) rotary shaft means extending in parallel to said longitudinal axis and spaced laterally therefrom;
   (b) a steering wheel (21);
   (c) a first steering means disposed at said first position and including:
      (i) an interlocking shaft 36 operatively connected at a lower end to said rotary shaft means and
      (ii) a connecting shaft (31) having means at an upper end removably engaging said steering wheel (21) and being operatively connected at a lower end to said interlocking shaft;
   (d) a second steering means disposed at said second position and including:
      (i) an input shaft (43) having means at an upper end for removably engaging said steering wheel and a first helical gear (46) at a lower end;
      (ii) an output shaft (44) having a second helical gear (47) at an upper end thereof in mesh with said first helical gear (46), and a lower end operatively connected to said rotary shaft (35); and
      (iii) a case (40) housing the first and second helical gears and mounted on said lateral flank;
   wherein the interlocking shaft (36) is slanted transversely of the vehicle body with the lower end thereof being located outwardly of the upper end of interlocking shaft (36), the interlocking shaft (36) being disposed laterally outwardly of the clutch housing (3);
   wherein the input shaft (43) is slanted longitudinally and transversely of the vehicle body with the lower end thereof being located rearwardly and outwardly of the upper end of said input shaft, wherein the second helical gear (47) being located outwardly of the first helical gear (46) transversely of the vehicle body and wherein the output shaft (44) is slanted longitudinally and transversely of the vehicle body such that the lower end thereof is located forwardly and outwardly of the upper end of the output shaft, the output shaft (44) being disposed laterally outwardly of the transmission case (44).

2. A steering system as claimed in claim 1 wherein the rotary shaft relay means includes a first rotary sahft (35) and a second rotary shaft (51), the input shaft (43), the output shaft (44) and the second rotary shaft (51) extending substantially along an undersurface of a floor cover (12) of said vehicle.

3. A steering system as claimed in claim 1 further comprising a first intermediate shaft (34) disposed between the interlocking shaft (36) and the rotary shaft means, the first intermediate shaft (34) being connected to the interlocking shaft (36) through a universal joint (38) and to the rotary shaft means through a bevel gear mechanism (56).

* * * * *